United States Patent
Cohen Tene

(10) Patent No.: US 12,145,508 B2
(45) Date of Patent: Nov. 19, 2024

(54) METHODS AND SYSTEMS FOR AUGMENTED TRAILER VIEW FOR VEHICLES

(71) Applicant: GM GLOBAL TECHNOLOGY OPERATIONS LLC, Detroit, MI (US)

(72) Inventor: Yovav Cohen Tene, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 110 days.

(21) Appl. No.: 18/048,984

(22) Filed: Oct. 24, 2022

(65) Prior Publication Data
US 2024/0131991 A1   Apr. 25, 2024
US 2024/0227681 A9   Jul. 11, 2024

(51) Int. Cl.
*B60R 1/26* (2022.01)

(52) U.S. Cl.
CPC ............ *B60R 1/26* (2022.01); *B60R 2300/60* (2013.01); *B60R 2300/80* (2013.01)

(58) Field of Classification Search
CPC ........... B60R 1/00; B60R 1/003; B60R 11/04; B60R 2300/105; B60R 2300/607; B60R 2300/806; B60R 2300/30; B60R 2300/303; B60R 2300/20; B60R 2300/305; B60R 2300/8086; B60R 2300/8066; B60R 2300/8093; B60R 2011/004; B60R 2300/10; B60R 2300/307; B60R 1/002; B60D 1/36; B60D 1/06; B60D 1/62; B60D 1/245; B60D 1/065; B62D 13/06; B62D 15/0285; B62D 15/025; B62D 15/027; G06T 2207/30252; G06T 7/70; G06T 7/73; G06T 7/60; G06T 2207/10016; B60W 10/20; B60W 2420/42; B60W 30/18036; B60W 50/14; B60W 10/18; B60W 2050/146; B60W 2300/14; B60W 10/04; G05D 2201/0213; G05D 1/0246; G05D 1/0225; G05D 1/0212

USPC ........ 348/148, 113, 118, 207.99; 701/36, 28
See application file for complete search history.

(56) References Cited

U.S. PATENT DOCUMENTS

| | | | |
|---|---|---|---|
| 2009/0042173 A1* | 2/2009 | Jaszlics | G09B 9/32 29/592 |
| 2017/0080928 A1* | 3/2017 | Wasiek | B60W 50/14 |
| 2017/0217368 A1* | 8/2017 | Lewis | H04N 7/183 |
| 2018/0272941 A1* | 9/2018 | Bliss | B62D 15/0295 |
| 2019/0084477 A1* | 3/2019 | Gomez-Mendoza | G06T 7/60 |
| 2020/0017143 A1* | 1/2020 | Gali | G06T 7/70 |
| 2020/0031398 A1* | 1/2020 | Maruoka | B62D 15/0295 |
| 2020/0130582 A1* | 4/2020 | Wong | B62D 13/06 |
| 2020/0282910 A1* | 9/2020 | Nagasamy | G06N 3/08 |

(Continued)

*Primary Examiner* — Christopher S Kelley
*Assistant Examiner* — Asmamaw G Tarko
(74) *Attorney, Agent, or Firm* — Lorenz & Kopf LLP

(57) ABSTRACT

Methods and systems are provided for displaying a scene for a vehicle towing a trailer. A method includes: determining, by the processor, an angle of the trailer relative to the vehicle; determining, by the processor, a simulated trailer based on the angle of the trailer; determining, by the processor, a projection matrix based on the simulated trailer; generating, by the processor, scene data based on image data from a camera of the vehicle and image data from a camera of the trailer using the projection matrix; and generating, by the processor, display data to display the scene to an occupant of the vehicle based on the scene data.

20 Claims, 3 Drawing Sheets

(56) References Cited

U.S. PATENT DOCUMENTS

| | | | |
|---|---|---|---|
| 2020/0324593 A1* | 10/2020 | Niewiadomski | B60D 1/06 |
| 2022/0024391 A1* | 1/2022 | Gali | G06T 7/73 |
| 2022/0027644 A1* | 1/2022 | Gali | G08G 1/16 |
| 2022/0028111 A1* | 1/2022 | Gali | B62D 13/00 |
| 2022/0134951 A1* | 5/2022 | Zhang | B60R 1/26 |
| | | | 348/148 |
| 2022/0135127 A1* | 5/2022 | Lu | B62D 5/04 |
| | | | 701/41 |
| 2023/0001984 A1* | 1/2023 | Lu | B62D 15/0295 |
| 2023/0356727 A1* | 11/2023 | Naiel | G06V 20/56 |

* cited by examiner

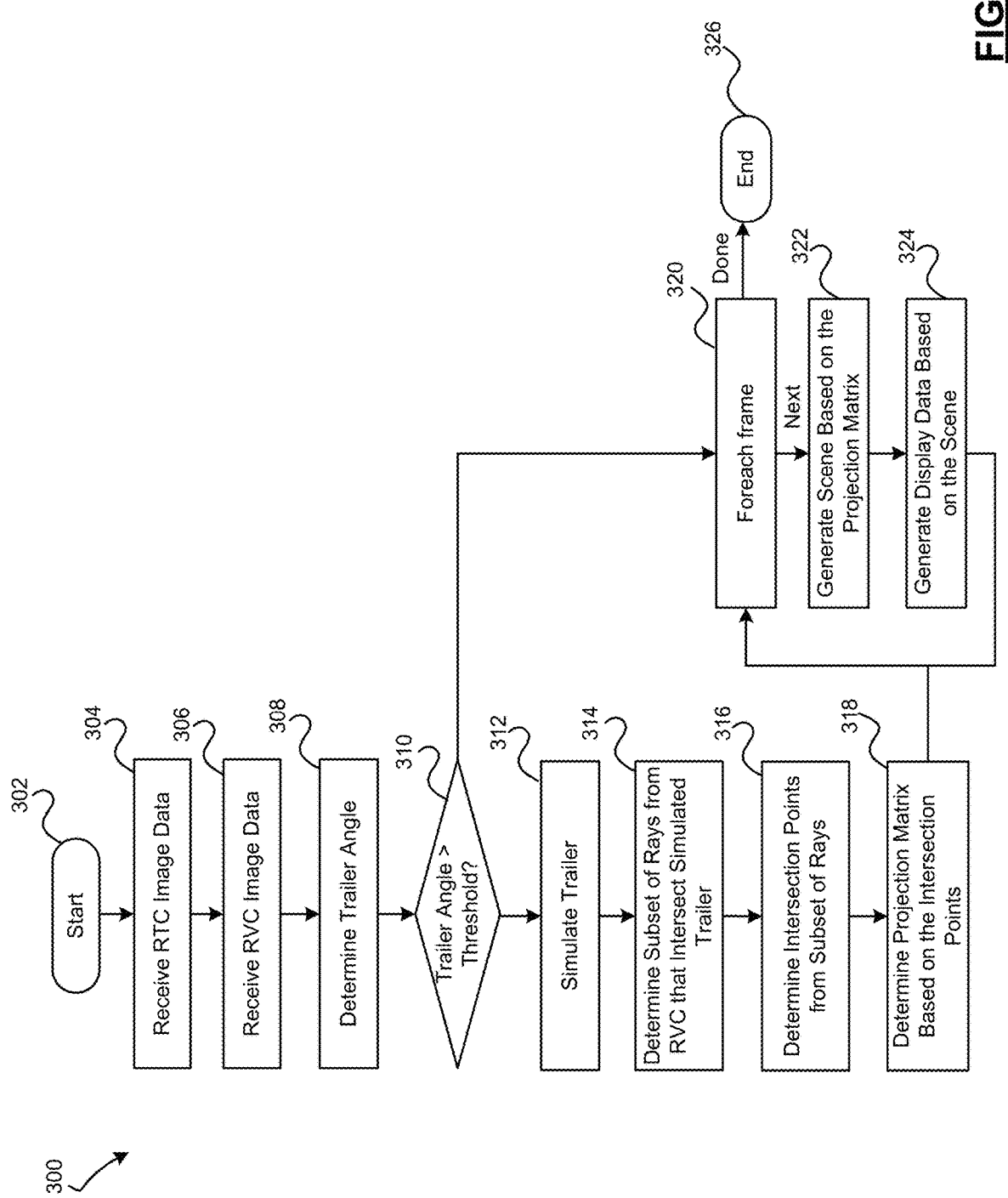

METHODS AND SYSTEMS FOR AUGMENTED TRAILER VIEW FOR VEHICLES

INTRODUCTION

The technical field generally relates to vehicles and, more specifically, to methods and systems for presenting an augmented view of a scene when a vehicle is towing a trailer.

Modern vehicles are typically equipped with one or more optical cameras that are configured to provide image data to an occupant of the vehicle. The image data may show a virtual scene of the vehicle's surroundings.

In some instances, trailers that are towable by the vehicle include one or more optical cameras. When the vehicle is towing the trailer, the images from the trailer camera and the images from the vehicle cameras are combined to provide a virtual view of the scene behind the vehicle. When the vehicle and the trailer are driving in a straight line, the scene is presented as if the trailer were invisible. It is desirable to provide a scene with the trailer being invisible in all driving conditions, especially in urban areas where straight driving is limited. In some cases, blind spots occur in the scene when the vehicle is driving in a non-straight manner.

Accordingly, it is desirable to provide improved methods and systems for presenting a view of a scene when a vehicle is towing a trailer during all driving conditions. Furthermore, other desirable features and characteristics of the present invention will become apparent from the subsequent detailed description of the invention and the appended claims, taken in conjunction with the accompanying drawings and this background of the invention.

SUMMARY

Methods and systems are provided for displaying a scene for a vehicle towing a trailer. A method includes: determining, by the processor, an angle of the trailer relative to the vehicle; determining, by the processor, a simulated trailer based on the angle of the trailer; determining, by the processor, a projection matrix based on the simulated trailer; generating, by the processor, scene data based on image data from a camera of the vehicle and image data from a camera of the trailer using the projection matrix; and generating, by the processor, display data to display the scene to an occupant of the vehicle based on the scene data.

In various embodiments, the method includes storing, in a data storage device, dimension parameters associated with the trailer, and wherein the determining the simulated trailer is based on the dimension parameters.

In various embodiments, the image data excludes the trailer from the scene.

In various embodiments, the method includes determining a set of rays that extend from the rear vehicle camera; determining a subset of the set of rays from the camera of the vehicle that intersect the simulated trailer, and wherein the determining the projection matrix is based on the subset. In various embodiments, the method includes determining a plurality of intersection points between the subset of rays and a defined dome of an environment of the vehicle, and wherein the determining the projection matrix is based on the plurality of intersection points.

In various embodiments, the camera of the vehicle is a rear facing camera.

In various embodiments, the camera of the trailer is a rear facing camera.

In various embodiments, the generating the scene data is based on a fisheye view.

In various embodiments, the method includes determining when the angle of the trailer is greater than a threshold, and in response to the angle being greater than a threshold, performing the steps of determining the projection matrix, generating the scene data, and the generating the display data.

In various embodiments, in response to the angle being less than the threshold, the method includes generating the scene data based on a previously determined projection matrix.

In another embodiment, a system includes: a non-transitory computer readable medium configured to store dimension parameters associated with the trailer; and a computer system onboard the vehicle and configured to, by a processor: determine an angle of the trailer relative to the vehicle; determine a simulated trailer based on the angle of the trailer and the dimension parameters; determine a projection matrix based on the simulated trailer; generate scene data based on image data from a camera of the vehicle and image data from a camera of the trailer using the projection matrix; and generate display data to display the scene to an occupant of the vehicle based on the scene data.

In various embodiments, the projection matrix is determined based on a three dimensional static approximation.

In various embodiments, the image data excludes the trailer from the scene.

In various embodiments, wherein the computer system is configured to determine a set of rays that extend from the rear vehicle camera; determine a subset of the set of rays from the camera of the vehicle that intersect the simulated trailer. The determining the projection matrix is based on the subset.

In various embodiments, wherein the computer system is configured to determine a plurality of intersection points between the subset of rays and a defined dome of an environment of the vehicle. The determining the projection matrix is based on the plurality of intersection points.

In various embodiments, the camera of the vehicle is a rear facing camera, and the camera of the trailer is a rear facing camera.

In various embodiments, the computer system is configured to generate the scene data based on a fisheye view.

In various embodiments, the computer system is configured to determine when the angle of the trailer is greater than a threshold, and in response to the angle being greater than a threshold, perform the steps of determining the projection matrix, generating the scene data, and the generating the display data.

In various embodiments, the computer system is configured to, in response to the angle being less than the threshold, generate the scene data based on a previously determined projection matrix.

In another embodiment a vehicle includes: a display; and a computer system configured to, by a processor: determine an angle of a trailer relative to the vehicle; determine a simulated trailer based on the angle of the trailer; determine a projection matrix based on the simulated trailer; generate scene data based on image data from a camera of the vehicle and image data from a camera of the trailer using the projection matrix; and generate display data including the scene data to the display such that a scene is presented to an occupant of the vehicle.

DESCRIPTION OF THE DRAWINGS

The present disclosure will hereinafter be described in conjunction with the following drawing figures, wherein like numerals denote like elements, and wherein:

FIG. 3 is a flowchart illustrating methods performed by the vehicle and the controller in accordance with various embodiments.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: a field-programmable gate array (FPGA), an application specific integrated circuit (ASIC), an electronic circuit, a processor (shared, dedicated, or grouped) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
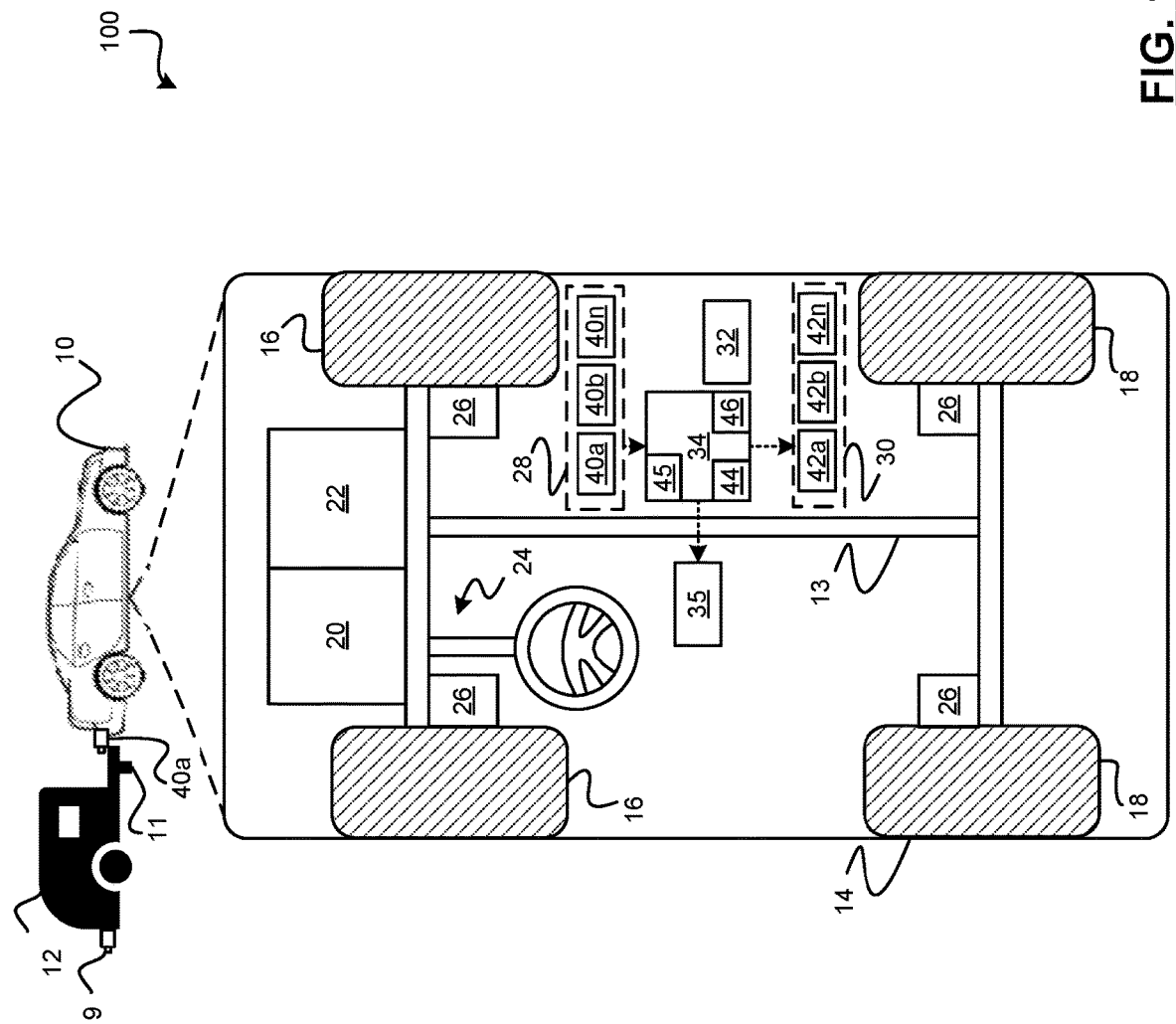
FIG. 1 is a schematic illustration of a vehicle with a controller implementing functions for generating a virtual view in accordance with various embodiments.

With reference to FIG. 1, a vehicle 10 is shown having a display system 100 in accordance with various embodiments. Generally, the display system 100 displays image data on a display 35 of the vehicle 10 to illustrate to an occupant of the vehicle a scene from the exterior environment of the vehicle 10. In various embodiment, the display system 100 displays image data according to a fisheye view format and from, for example, a rear perspective of the vehicle 10.

In various embodiments, the vehicle 10 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In various embodiments, the vehicle 10 may also comprise other types of mobile platforms and is not limited to an automobile.

In various embodiments, the vehicle 10 is associated with a trailer 12 capable of hauling a load. As can be appreciated, the trailer 12 may any type of towable application having one or more wheels and is not limited to any one embodiment. In various embodiments, the trailer 12 includes one or more sensors 9 configured to sense observable conditions associated with the trailer 12. In various embodiments, the sensors include a camera (RTC 9) configured to sense an environment at or near a rear portion of the trailer 12 and to generate image data based thereon. In various embodiments, the camera is configured to provide a fish eye view of the environment behind the trailer 12.

In various embodiments, the trailer 12 is configured to couple to and connect to vehicle 10 via a connection apparatus 11, such as a hitch system, such that the vehicle 10 can tow the trailer 12. In various embodiments, the connection apparatus 11 further comprises a wiring harness configured to communicate power and/or communication signals, such as signals including the image data, between the vehicle 10 and components of the trailer 12.

As depicted in FIG. 1, the exemplary vehicle 10 generally includes a chassis 13, a body 14, front wheels 16, and rear wheels 18. The body 14 is arranged on the chassis 13 and substantially encloses components of the vehicle 10. The body 14 and the chassis 13 may jointly form a frame. The wheels 16-18 are each rotationally coupled to the chassis 13 through near a respective corner of the body 14.

The vehicle 10 further includes a propulsion system 20, a transmission system 22, a steering system 24, a brake system 26, a sensor system 28, an actuator system 30, at least one data storage device 32, at least one controller 34, a communication bus 33, and a display 35. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior and/or interior environment of the vehicle and/or of the vehicle itself. The sensing devices 40a-40n can include, but are not limited to, radars, lidars, global positioning systems, optical cameras, thermal cameras, ultrasonic sensors, inertial measurement units, pressure sensors, position sensors, displacement sensors, speed sensors, and/or other sensors. In various embodiments, the sensor system 28 includes a camera (RVC 40a) configured to sense an environment at or near a rear portion of the vehicle 10 and to generate image data based thereon. As can be appreciated, the RVC 40*a* may be configured at various locations (e.g., side view mirrors, roof top, etc.) about the vehicle 10 and is not limited to a rear location (i.e., a rear bumper). In various embodiments, the sensor system 28 includes an inertial measurement unit (IMU 40*c*) that measures an orientation of the vehicle 10 and generates IMU data based thereon. In various embodiments, the sensor system 28 includes an articulation sensor 40*b* that measures an articulation of the trailer 12 relative to the vehicle 10 and generates articulation data based thereon.

The actuator system 30 includes one or more actuator devices 42*a*-42*n* that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in controlling the vehicle 10. In various embodiments, the data storage device 32 stores defined values for controlling the vehicle 10. As can be appreciated, the data storage device 32 may be part of the controller 34, separate from the controller 34, or part of the controller 34 and part of a separate system.

The controller 34 includes at least one processor 44, a communication bus 45, a computer readable storage device or media 46. The processor 44 can be any custom made or commercially available processor, a central processing unit (CPU), a graphics processing unit (GPU), a field-programmable gate array (FPGA), an application specific integrated circuit (ASIC), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10. The bus 45 serves to transmit programs, data, status and other information or signals between the various components of the vehicle and/or trailer. The bus 45 can be any suitable physical or logical means of connecting computer systems and components. This includes, but is not limited to, direct hard-wired connections, fiber optics, infrared, and wireless bus technologies.

The instructions may include one or more separate programs, each of which comprises an ordered listing of executable instructions for implementing logical functions. The instructions, when executed by the processor 44, receive and process signals from the sensor system 28 and/or communication bus 45, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10.

In various embodiments, one or more instructions of the controller 34 are embodied in the display system 100 and, when executed by the processor 44, receive data from the sensor system 28 of the vehicle 10, and the sensors 9 of the trailer 12 (e.g., via the communication bus 45) and process the received data in order to generate display data for displaying a virtual view of a scene behind the vehicle 10 when towing the trailer 12. For example, the instructions process the received data to determine an angle of the trailer 12. For every angle of the trailer 12, the instructions determine a new projection matrix and use the projection matrix to generate a single homogeneous image from the cameras 40*a*, and 9 for every frame. The dynamically determined projection matrix allows for adjustment of the data that is used from the RTC 9 and adjustment of the data that is used from the RVC 40*a* and thus, reduces the size of any blind spots when the vehicle 10 and the trailer 12 are travelling in a non-straight manner.

As can be appreciated, the controller 34 may otherwise differ from the embodiment depicted in FIG. 1. For example, the controller 34 may be coupled to or may otherwise utilize one or more remote computer systems and/or other control systems, for example as part of one or more of the above-identified vehicle and/or trailer systems. It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 44) to perform and execute the program. Such a program product may take a variety of forms, and the present disclosure applies equally regardless of the particular type of computer-readable signal bearing media used to carry out the distribution. Examples of signal bearing media include recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 34 may also otherwise differ from the embodiment depicted in FIG. 1, for example in that the computer system of the controller 34 may be coupled to or may otherwise utilize one or more remote computer systems and/or other control systems.

Figure 2:
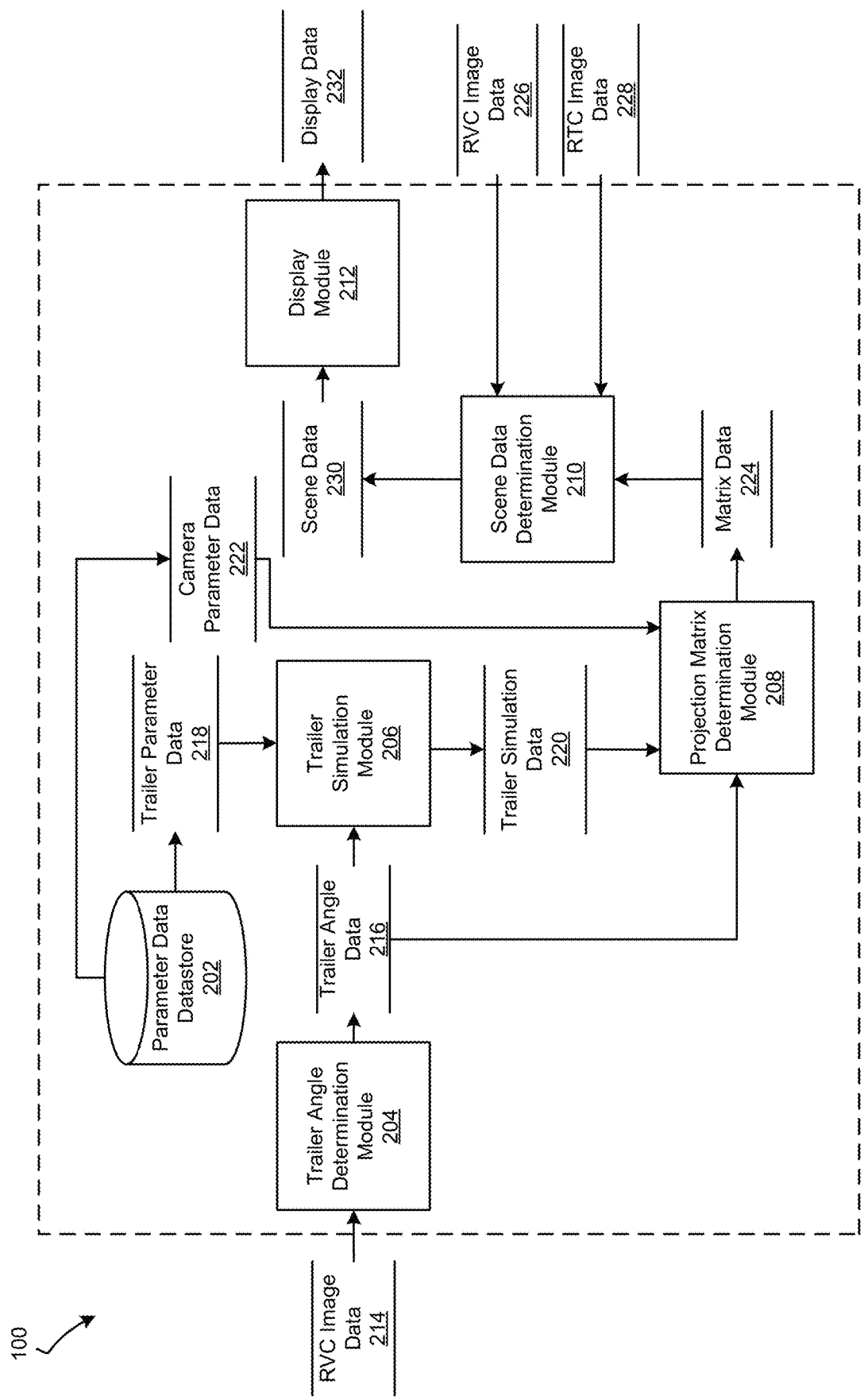
FIG. 2 is a dataflow diagram illustrating the controller of the vehicle in accordance with various embodiments.

With reference to FIG. 2 and with continued reference to FIG. 1, a dataflow diagram illustrates elements of the display system 100 of FIG. 1 in accordance with various embodiments. As can be appreciated, various embodiments of the display system 100 according to the present disclosure may include any number of modules embedded within the controller 34 which may be combined and/or further partitioned to similarly implement systems and methods described herein. Furthermore, inputs to the display system 100 may be received from the sensor system 28, received from the communication bus 45, received from other control modules (not shown) associated with the vehicle 10, and/or determined/modeled by other sub-modules (not shown) within the controller 34 of FIG. 1. Furthermore, the inputs might also be subjected to preprocessing, such as sub-sampling, noise-reduction, normalization, feature-extraction, missing data reduction, and the like. In various embodiments, the display system 100 includes a parameter data datastore 202, a trailer angle determination module 204, a trailer simulation module 206, a projection matrix determination module 208, a scene determination module 210, and a display module 212.

In various embodiments, the parameter data datastore 202 stores parameters associated with the trailer 12 and the vehicle 10, and stores parameters associated with the cameras 9, 40a. For example, the trailer and vehicle dimensions including length and width are stored as parameters in the parameter data datastore 202. In another example, camera position and orientation data is stored as parameters in the parameter data datastore 202. As can be appreciated, the parameters may be stored when the trailer 12 is connected to the vehicle 10, based on user input, and/or by other means of updating stored data.

In various embodiments, the trailer angle determination module 204 receives as input camera image data 214 from the RVC 40a of the vehicle 10. The trailer angle determination module 204 uses the camera image data 214 to determine an angle of the trailer 12 in relation to the vehicle 10 and generates trailer angle data 216 based thereon. For example, the trailer angle determination module 204 analyzes the image data to identify the trailer 12 or a centerline thereof and the vehicle 10 and then identify an angle between the identified vehicle and the identified trailer.

In various embodiments, the trailer simulation module 206 receives as input the trailer angle data 216. The trailer simulation module 206 retrieves from the datastore 202 the trailer parameter data 218. Based on the trailer angle from the trailer angle data 216 and the trailer length and width from the parameter data 218, the trailer simulation module 206 generates trailer simulation data 220 that includes a simulation of the trailer 12.

In various embodiments, the projection matrix determination module 208 receives as input the trailer angle data 216, and the trailer simulation data 220. The projection matrix determination module retrieves from the datastore 202 the camera parameter data 222. Based on the inputs, the projection matrix determination module 208 determines a projection matrix for each change of the angle of the trailer 12, for example, that is greater than a threshold.

For example, in various embodiments, the projection matrix determination module 208 determines a first set of rays that originate from the RVC 40a and extend into the environment. The projection matrix determination module 208 then determines from the first set of rays a subset of the rays that that intersect with the simulated trailer. The projection matrix determination module 208 then determines intersection points between the subset of rays and a defined (e.g., either statically defined or dynamically defined) dome of the environment surrounding the vehicle 10. The projection matrix determination module 208 determines the intersection points using, for example, three dimensional static approximation or other methods. The projection matrix determination module 208 then determines a second set of rays that extend between the identified intersection points of the dome and points from the RTC 9. The projection matrix determination module 208 generates projection matrix data 224 using the second set of rays.

In another example, in various embodiments, the projection matrix determination module 208 determines a first set of rays that originate from the RVC 40a and extend into the environment. The projection matrix determination module 208 then determines from the first set of rays a subset of the rays that that intersect with the simulated trailer. The projection matrix determination module 208 determines a second set of rays that originate from the RTC 9 and extend into the environment using the global coordinate system. The projection matrix determination module 208 then identifies intersection points between the subset of rays and the second set of rays using, for example, a nearest neighbor method or other method. The projection matrix determination module 208 generates projection matrix data 224 using the identified intersection points.

In various embodiments, the scene determination module 210 receives as input the projection matrix data 224, rear vehicle camera (RVC) image data 226, and rear trailer camera (RTC) image data 228. The scene determination module 210 generates scene data 230, for example, for each frame of the image data, using the projection matrix data. For example, the scene determination module 210 generates a template of pixels according to a fisheye view and populates the pixels of the template with pixels from the RVC 40a and pixels from the RTC 9 based on the projection matrix.

In various embodiments, the display module 212 receives as input the scene data 230. The display module 212 generates display data 232. The display data 232 is used for displaying the scene on the display 35 of the vehicle 10 such that an occupant of the vehicle 10 can view the scene behind the vehicle 10 while the vehicle 10 is traveling in either a non-straight manner or a straight manner without any blind spots.

With reference now to FIG. 3 and with continued reference to FIGS. 1-2, a flowchart provides a method 300 for displaying a scene by a display 35 of a vehicle 10, in accordance with exemplary embodiments. As can be appreciated in light of the disclosure, the order of operation within the method 300 is not limited to the sequential execution as illustrated in FIG. 3, but may be performed in one or more varying orders as applicable and in accordance with the present disclosure. In various embodiments, the method 300 can be scheduled to run based on one or more predetermined events, and/or can run continuously during operation of the vehicle 10.

In one example, the method 300 may begin at 302. The RTC image data 228 is received at 304. The RVC image data 214, 226 is received at 306. Using the RVC image data 214 or other sensor data, the trailer angle in relation to the vehicle 10 is determined at 308 and evaluated at 310.

When a change in the trailer angle is greater than a threshold at 310, a simulation of the trailer 12 is generated using the trailer dimensions and the trailer angle at 312. The subset of rays from the RVC 40a that intersect the simulated trailer is determined at 314. The intersection points between the subset of rays and the defined dome or the rays that extend from the RTC 9 are determined at 316. Using the identified rays and/or intersections points, a projection matrix is determined, and a template is generated based thereon for rendering a new rear vehicle camera image at 318.

Thereafter or contemporaneously therewith, for each frame of the RVC image data 226 at 320, scene data 230 is generated using the template and a combination of the RVC image data 226 and the RTC image data 228 at 322. Display data 232 is generated from the scene data 230 at 324. Once all frames have been processed at 320, the method 300 may end at 326.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. A method for displaying a scene for a vehicle towing a trailer, comprising:
   determining, by a processor, an angle of the trailer relative to the vehicle;
   determining, by the processor, a simulated trailer based on the angle of the trailer and a trailer dimension parameter;
   determining a first set of rays that extend from a rear vehicle camera;
   determining a first subset of the first set of rays from the rear vehicle camera that intersect the simulated trailer;
   determining a second subset of the first set of rays from the rear vehicle camera that do not intersect the simulated trailer;
   determining, by the processor, a projection matrix based on the simulated trailer in response to the first subset of the first set of rays;
   determining a second set of rays from a rear trailer camera;
   determining a plurality of intersection points between the first subset of the first set of rays and the second set of rays;
   generating, by the processor, scene data based on image data from the rear vehicle camera corresponding to the second subset of the first set of rays and image data from the rear trailer camera corresponding to the second set of rays from a rear trailer camera and the plurality of intersection points between the first subset of the first set of rays and the second set of rays and the projection matrix; and
   generating, by the processor, display data to display the scene to an occupant of the vehicle based on the scene data.

2. The method of claim 1, further comprising storing, in a data storage device, dimension parameters associated with the trailer, and wherein the determining the simulated trailer is based on the dimension parameters.

3. The method of claim 1, wherein the image data excludes the trailer from the scene.

4. The method of claim 1, wherein the determining the projection matrix is based on identifying the plurality of intersection points between the first subset of the first set of rays, the second set of rays, and a defined dome of an environment surrounding the vehicle using a nearest neighbor method and wherein the scene data is generated in response to the projection matrix data, rear vehicle camera image data, and rear trailer camera image data.

5. The method of claim 4, further comprising determining a plurality of intersection points between the subset of rays and a defined dome of an environment of the vehicle, and wherein the determining the projection matrix is based on the plurality of intersection points.

6. The method of claim 1, wherein the camera of the vehicle is a rear facing camera.

7. The method of claim 1, wherein the camera of the trailer is a rear facing camera.

8. The method of claim 1, wherein the generating the scene data is based on a fisheye view.

9. The method of claim 1, further comprising determining when the angle of the trailer is greater than a threshold, and in response to the angle being greater than a threshold, performing the steps of determining the projection matrix, generating the scene data, and the generating the display data.

10. The method of claim 9, further comprising in response to the angle being less than the threshold, generating the scene data based on a previously determined projection matrix.

11. A system for displaying a scene for a vehicle towing a trailer, comprising:
    a non-transitory computer readable medium configured to store dimension parameters associated with the trailer; and
    a computer system onboard the vehicle and configured to, by a processor:
    determine an angle of the trailer relative to the vehicle;
    determine a simulated trailer based on the angle of the trailer and the dimension parameters;
    determine a first set of rays that extend from a rear vehicle camera;
    determine a first subset of the first set of rays from the rear vehicle camera that intersect the simulated trailer;
    determine a second subset of the first set of rays from the rear vehicle camera that do not intersect the simulated trailer
    determine a projection matrix based on the simulated trailer in response to the first subset of the first set of rays;
    determine a second set of rays from a rear trailer camera;
    determine a plurality of intersection points between the first subset of the first set of rays and the second set of rays;
    generate scene data based on image data from a the rear vehicle camera corresponding to the second subset of the first set of rays and image data from a the rear trailer camera corresponding to the second set of rays from a rear trailer camera and the plurality of intersection points between the first subset of the first set of rays and the second set of rays and the projection matrix; and
    generate display data to display the scene to an occupant of the vehicle based on the scene data.

12. The system of claim 11, wherein the projection matrix is determined based on a three dimensional static approximation.

13. The system of claim 11, wherein the image data excludes the trailer from the scene.

14. The system of claim 11, wherein the determining the projection matrix is based on identifying the plurality of intersection points between the first subset of the first set of rays, the second set of rays, and a defined dome of an environment surrounding the vehicle using a nearest neighbor method and wherein the scene data is generated in response to the projection matrix data, rear vehicle camera image data, and rear trailer camera image data.

15. The system of claim 14, wherein the computer system is further configured to determine a plurality of intersection points between the subset of rays and a defined dome of an environment of the vehicle, and wherein the determining the projection matrix is based on the plurality of intersection points.

16. The system of claim 11, wherein the camera of the vehicle is a rear facing camera, and wherein the camera of the trailer is a rear facing camera.

17. The system of claim 11, wherein the wherein the computer system is further configured to generate the scene data based on a fisheye view.

18. The system of claim 11, wherein the computer system is further configured to determine when the angle of the trailer is greater than a threshold, and in response to the angle being greater than a threshold, perform the steps of determining the projection matrix, generating the scene data, and the generating the display data.

19. The system of claim 18, wherein the computer system is further configured to in response to the angle being less than the threshold, generate the scene data based on a previously determined projection matrix.

20. A vehicle, comprising:
a display; and
a computer system configured to, by a processor:
determine an angle of a trailer relative to the vehicle;
determine a simulated trailer based on the angle of the trailer and a trailer dimension;
determine a first set of rays that extend from a rear vehicle camera;
determine a first subset of the first set of rays from the rear vehicle camera that intersect the simulated trailer;
determine a second subset of the first set of rays from the rear vehicle camera that do not intersect the simulated trailer
determine a projection matrix based on the simulated trailer in response to the first subset of the first set of rays;
determine a second set of rays from a rear trailer camera;
determine a plurality of intersection points between the first subset of the first set of rays and the second set of rays;
generate scene data based on image data from the rear vehicle camera corresponding to the second subset of the first set of rays and image data from of the rear trailer camera corresponding to the second set of rays from a rear trailer camera and the plurality of intersection points between the first subset of the first set of rays and the second set of rays and the projection matrix; and
generate display data including the scene data to the display such that a scene is presented to an occupant of the vehicle.

* * * * *